Aug. 28, 1945.     B. A. ANDALIKIEWICZ ET AL     2,383,438
MULTIPLE COIN CONTROL MECHANISM FOR VENDING MACHINES
Filed Aug. 1, 1941.     6 Sheets-Sheet 1

INVENTORS.
Boley A. Andalikiewicz
Drexel T. Carlson
Jerome E. Hagstrom
BY
ATTORNEY.

Aug. 28, 1945.   B. A. ANDALIKIEWICZ ET AL   2,383,438
MULTIPLE COIN CONTROL MECHANISM FOR VENDING MACHINES
Filed Aug. 1, 1941   6 Sheets-Sheet 2

INVENTORS.
Boley A. Andalikiewicz
Drexel T. Carlson
Jerome E. Hagstrom
BY
ATTORNEY.

Aug. 28, 1945. B. A. ANDALIKIEWICZ ET AL 2,383,438
MULTIPLE COIN CONTROL MECHANISM FOR VENDING MACHINES
Filed Aug. 1, 1941 6 Sheets-Sheet 4

INVENTORS.
Boley A. Andalikiewicz
Draxel T. Carlson
Jerome E. Hagstrom
BY
ATTORNEY.

Aug. 28, 1945.  B. A. ANDALIKIEWICZ ET AL  2,383,438
MULTIPLE COIN CONTROL MECHANISM FOR VENDING MACHINES
Filed Aug. 1, 1941  6 Sheets-Sheet 5

INVENTORS.
Boley A. Andalikiewicz
Drexel T. Carlson
Jerome E. Hagstrom
BY
ATTORNEY.

Aug. 28, 1945.   B. A. ANDALIKIEWICZ ET AL   2,383,438
MULTIPLE COIN CONTROL MECHANISM FOR VENDING MACHINES
Filed Aug. 1, 1941   6 Sheets-Sheet 6

INVENTORS.
Boley A. Andalikiewicz
Drexel T. Carlson
Jerome E. Hagstrom
BY
ATTORNEY.

Patented Aug. 28, 1945

2,383,438

UNITED STATES PATENT OFFICE 2,383,438

MULTIPLE COIN CONTROL MECHANISM FOR VENDING MACHINES

Boley A. Andalikiewicz, Drexel T. Carlson, and Jerome E. Hagstrom, Kansas City, Mo., assignors to C. Earl Hovey, Kansas City, Mo., as trustee Application August 1, 1941, Serial No. 405,042

9 Claims. (Cl. 194—63)

This invention relates to vending machines of the multiple coin controlled type and has for its primary object, the provision of mechanism for establishing connection between a movable part of the vending machine and the manually operated element thereof, which mechanism is effective only upon introduction of at least two coins of different denomination.

One of the important aims of the instant invention is the provision of vending equipment having as a part thereof, multiple coin controlled elements designed to receive coins of different diameters and to employ one of said coins as a means for completing the passage for the other.

A yet further aim of the instant invention is the provision of multiple coin controlled mechanism for vending machines wherein is included a detent for one of the coins disposed to retain a coin in a place where the subsequently introduced coin will be directed through a normal path of travel, said coin in the detent being dislodged from the detent by unique parts arranged to be actuated by a member of the vending machine after the article being vended has been rendered available to the user.

A yet further aim of this invention is to provide a multiple coin mechanism for vending machines having a coin passage; a detent within said passage for retaining a coin of a predetermined diameter; means interlockable by one of the coins only after a coin has been deposited in said detent; and equipment for dislodging the coin in the detent after the interlocked means have permitted manipulation of the vending machine to a point where an article is available.

Another important aim of this invention is the provision in a multiple coin controlled mechanism for vending machine of parts attachable to the conventional slug rejector of such machine, whereby two coins of different denominations are necessarily introduced before it is possible to actuate the machine to a point where an article may be withdrawn therefrom.

A vast number of vending machines, of the character shown, for example, in Patent No. 2,099,557, issued November 16, 1937, are in use and the various tax laws now in effect and about to be enacted, are requiring the collection of a tax over and above the purchase price of the article being vended from these machines. The problem, therefore, which this invention solves in an effective and unique manner, is that of quickly, inexpensively and satisfactorily converting the mechanism to render it operative only upon the introduction of at least two coins. More specifically, a commodity such as a bottled drink, has heretofore been sold for 5¢—the tax on such goods in many States is now 1¢ and therefore, the coin controlled mechanism required is what is commonly termed "a 6¢ chute."

Parts made in accordance with this invention may be added to certain of the chutes now in use, and obviously, coin chutes or slug rejectors may be made as hereinafter specified and shown in the accompanying drawings wherein:

The multiple coin controlled mechanism illustrated in Figs. 1 to 10 inclusive, embodies one form of the invention and is usable with vending machines having a movable part 16, which in this instance, is in the nature of an annular rack engaged by a pinion 18 rigid to shaft 20 journalled in bearing 22 on the vending machine cover 24.

Ratchet wheel 26 is secured to shaft 20 for rotation therewith and is engaged by dog 28 yieldably held against the notched periphery of ratchet wheel 26 by spring 30.

Ratchet wheel 26 is provided with a number of radial apertures 32 into which one of the two coins 34 extends when its edge is slidably rested upon base plate 36 anchored to cover 24 by bolts or analogous means 38. A slot 40 formed through base plate 36 and cover 24 allows coin 34 to drop into a suitable receptacle, not here shown, when part 16 has been moved to a point where an article is made available to the user.

Plate 42 has a single radial slot 44 therein movable through an arcuate path of travel above and concentric with the path of travel wherein apertures 32 are positioned. Plate 42 is loosely mounted on shaft 20 and has a radial slot 46 therein to receive roller 48 on reciprocably supported operating plunger 50. This plunger is journalled in bearings 52 and 54 and maintained at one end of its path of travel by spring 56.

All of the parts just described are disclosed in U. S. Letters Patent No. 2,250,816, issued July 29, 1941, and therefore, form no part of this invention except as they may contribute to the combination hereinafter claimed.

Figure 6:
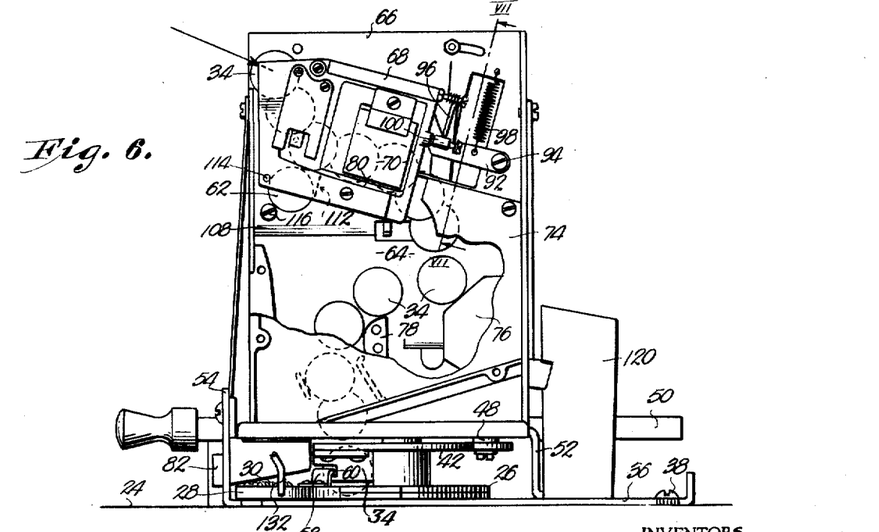
Fig. 6 is an elevational view of the side of the mechanism illustrated in Fig. 3.
Figure 7:
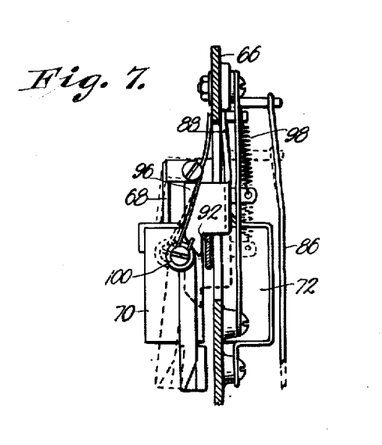
Fig. 7 is a detailed sectional view taken on line VII—VII of Fig. 6 and looking in the direction of the arrows.

An ear 58 rigid with dog 28 has a cam face 60 provided thereon for engagement by coin 34 when the latter is in the position shown in dotted lines at the lower part of Fig. 6 to interconnect ratchet 26 and plate 42. This coin 34 reaches said position only after a previously introduced coin 62 is dropped into the coin passage 64 formed between wall 66 and swinging frame 68.

A frame of this general character has been employed on slug rejectors now on the market and it will be understood by those skilled in the art, that it circumscribes magnet 70 which cooperates with magnet 72 mounted on wall 66 and between which all coins entering the lower portion of passage 64, formed between wall 66 and wall 74 must travel.

An anvil 76 of conventional type, is disposed between wall 66 and wall 74 and is struck by coin 34 to establish a sufficient amount of energy to carry the coin over partition 78 and thence to the operative position interconnecting ratchet 26 and plate 42 (Fig. 6).

Frame 68 has an inclined shoulder 80 formed along its inner face over which coins 34 must roll as they move through their normal path of travel. If a spurious coin is introduced and arrested between magnets 70 and 72, the same is returned through conduit 82 upon movement of operating plunger 50. Such return is accomplished through the medium of link 84 connecting wire 86, rocker arm 88, normally held in position at one end of its path of travel by spring 90, and finger 92, pivotally mounted to wall 66 as at 94. This finger 92 is of non-magnetic material and passes downwardly between magnets 70 and 72 when rocker arm 88 is drawn to the position shown in dotted lines of Fig. 2.

A laterally projecting ear 96 on rocker arm 88 not only forces finger 92 downwardly against the power of spring 98, but engages roller 100 on frame 68 to move the lower portion of the latter outwardly about the axis of pins 102 and 104.

The wall 74 terminates in an upper edge spaced below the upper edge of wall 66 and a portion of this upper edge of wall 74 is inclined as at 106 to cooperate with downwardly and outwardly inclined surfaces 108 of wall 66. These two faces 106 and 108 direct coins falling from shoulder 80 of frame 68 into return conduit 82, the upper portion of which is formed between wall 74 and plate 110.

Figure 8:
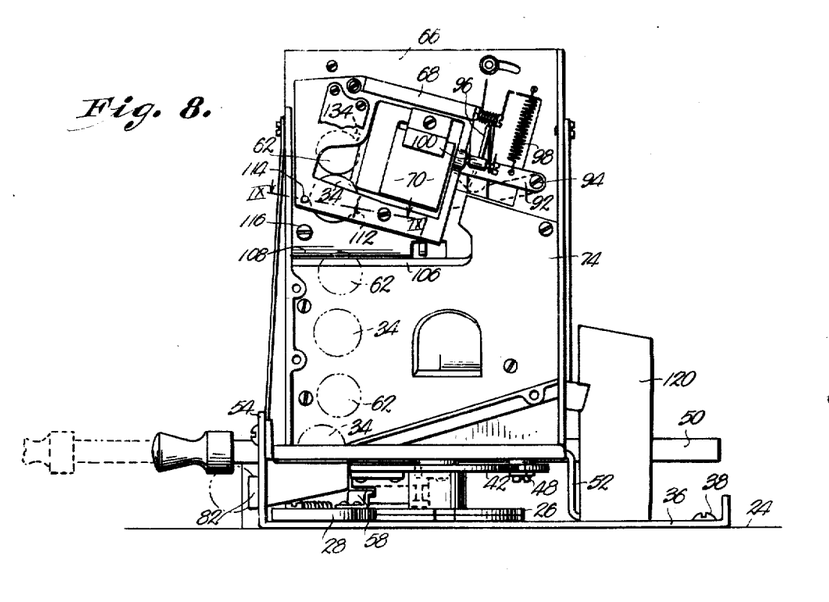
Fig. 8 is a side elevational view similar to Fig. 6, but illustrating the manner in which coins are returned to the operator unless the coins are introduced in proper sequence.
Figure 9:
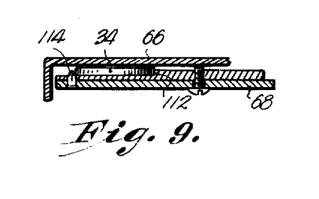
Fig. 9 is an enlarged fragmentary detailed sectional view taken on line IX—IX of Fig. 8.

Abutment 112 extends transversely with shoulder 80 and across the lower stretch of frame 68 where it engages the edge of coin 34, which in this instance, is a 5¢ piece, in a manner illustrated in Fig. 8. Coin 62 in the illustrated embodiment shown in the drawings, is a 1¢ piece, or a penny, and the difference in diameters of these two coins governs the action of the machine. These coins should be introduced in proper sequence, i. e., the penny should be introduced first and then the 5¢ piece 34. If the 5¢ piece is introduced first, the path of travel of that coin will be as indicated in the dot and dash lines shown in Fig. 8.

The 5¢ piece 34 lodges between abutment 112 and pin 114 mounted on swingable frame 68, the distance between which parts is great enough to permit the passage of coin 62. The detent for penny 62 is created not only by abutment 112, but by a cooperating supporting pin 116 mounted directly on wall 66 in the position better shown in Fig. 6.

In order that coin 62 might be conveyed to the coin box, not here shown, where it may be collected by the proper party and wherein coins 34 are deposited, an auxiliary delivery trough 118 is mounted directly on plate 110 at an angle to the horizontal and with its lowermost end in communication with delivery chute 120. Plate 110 has an opening 122 formed therein immediately below frame 68 and the detent created by abutment 112 and pin 116. Opening 122 receives head 124, one face of which is downwardly and outwardly inclined toward trough 118. Head 124 is mounted on rocker arm 126 journalled in bearing 128 on plate 110 and a spring 130 yieldably maintains head and rocker arm 124 and 126 respectively in the position shown in Figs. 5 and 10.

Figure 10:
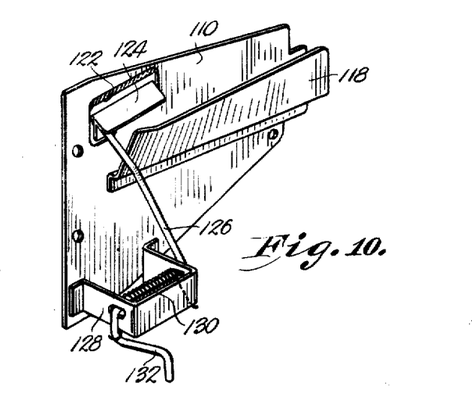
Fig. 10 is a perspective view illustrating the manner of constructing one of the removable plates of the mechanism to establish unitary assembly.
Figure 11:
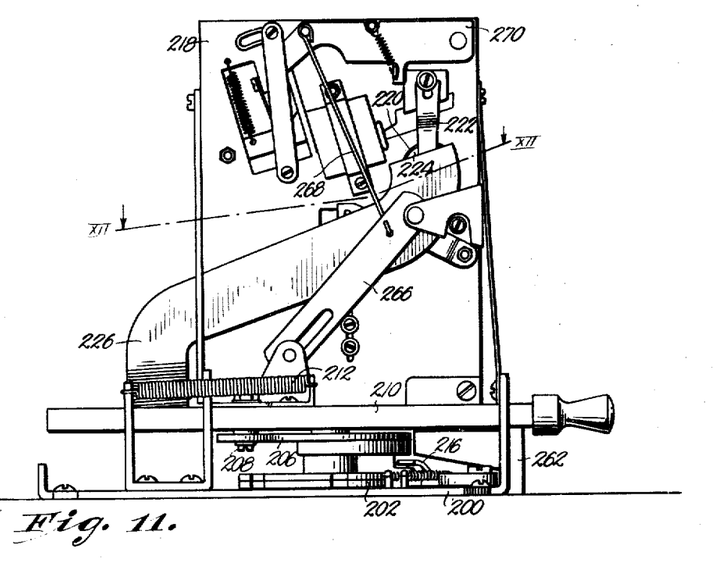
Fig. 11 is a side elevational view of a multiple coin controlled mechanism for vending machines, made in accordance with a modified form of the invention.
Figure 12:
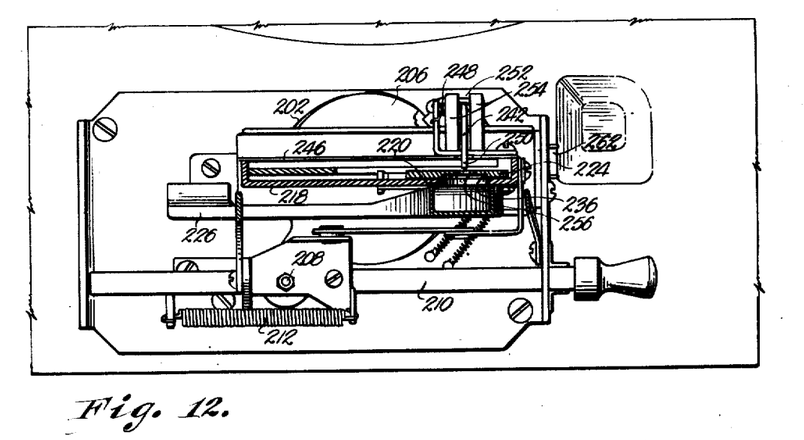
Fig. 12 is a sectional view taken on line XII—XII of Fig. 11.
Figure 13:
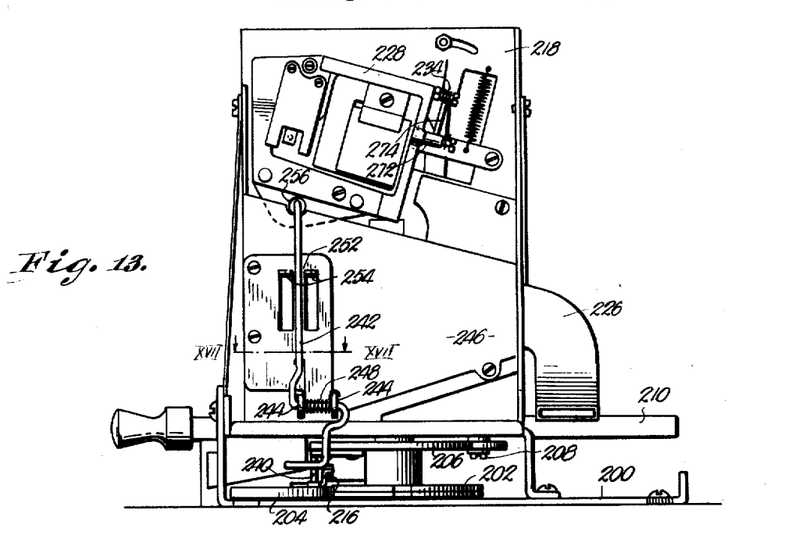
Fig. 13 is an elevational view of the side of the mechanism opposite to that illustrated in Fig. 11.
Figure 14:
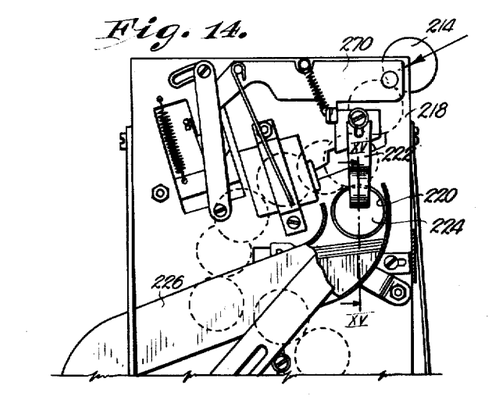
Fig. 14 is a fragmentary side elevational view similar to that shown in Fig. 11, but illustrating a coin in the detent and the path of travel of the second coin through the passage.

Rocker arm 126 is bent into the form of a crank 132 at its lower end for engagement with dog 28 as said dog is forced out of the notches in ratchet 26 by coin 74 moving into engagement with cam face 60. Plate 110 is removable and when constructed as illustrated in Fig. 10, may be applied to the coin chute when a similar plate not embodying the invention, has been removed from position.

Operation

While the structure just described and illustrated in Figs. 1 to 10 inclusive, is simple in operation, and those skilled in the art will readily recognize the manner in which coin controlled mechanism may be constructed to attain the ends in mind, it will be beneficial to indicate some of the peculiarities and advantages when the structure is employed as a so-called 6¢ unit.

The normal operation is first to drop coin 62, which is a 1¢ piece, into passage 64 where it will seek the position shown in Fig. 6, in a detent comprising abutment 112 and stop 116. In such position the upper portion of the annular edge of coin 62 will serve as a part of the surface along which the subsequently dropped coin 34 will travel. In this instance, coin 34 is a 5¢ piece, and when it strikes the upper edge of penny 62, it will move by gravity along the inclined shoulder 80 and then will follow the path of travel shown in Fig. 6, until it rests in an aperture 32 of ratchet 26 and slot 44 of plate 42. The mechanism is then set for normal operation and the movement of operating plunger 50 to the position shown in dotted lines of Fig. 2, will rotate plate 42 about the axis of shaft 20 and thereby cause ratchet 26 to drive shaft 20 and rotate pinion 18 in mesh with the rack or some movable part 16 of the vending machine for the purpose of conditioning the machine for the withdrawal or dispersing of an article.

As plate 42 is so moved to perform the duty just set down, coin 34 will wipe against cam face 60 of ear 58, in time to move dog 28 out of the notches in ratchet 26 to free the same. When coin 34 has reached a position over slot 40, it will drop from a place interconnecting ratchet 26 and plate 42.

The outward movement of dog 28 established by the interengagement of coin 34 and ear 58, causes portion 132 of rocker arm 126 to swing about the axis of the stretch thereof journalled in bearing 128. Such swinging movement forces head 124 through opening 122 and against inclined face 106 of wall 74 to bridge the space between wall 74 and plate 110 and establish a surface against which coin 62 will drop when frame 68 swings outwardly. Coin 62 therefore, will not be permitted to enter the return conduit 82 by way of the space between wall 74 and plate 110, but will be directed outwardly through opening 122 and thence downwardly by the action of gravity, into trough 118 where it will travel to auxiliary chute 120 and from there enter the coin box with coin 34 that has dropped through slot 40 in base plate 36 and cover 24 of the vending machine.

Frame 68 swings outwardly immediately after dog 28 is pushed from a notch in ratchet 26 and just before the movement of operating plunger 50 moves said frame 68 about pins 102 and 104, through the medium of link 84, wire 86, rocker arm 88, cam face 96 and roller 100 carried by frame 68 below pin 102 about which is wound a spring in conventional manner to yieldably hold frame 68. Thus, part 16 of the vending machine, is moved only after a penny and a nickel 62 and 34 respectively, have been introduced in the order named.

If the customer should inadvertently drop a 5¢ piece 34 into the mechanism prior to dropping penny 62, the 5¢ piece would hang on frame 68 in the position shown in full lines of Fig. 8. The distance between abutment 112 and pin 114 is less than the diameter of coin 34, and therefore, the latter cannot pass between the abutment and said pin. When the penny 62 is dropped, it will rest upon the top of 5¢ piece 34 and against pin 134 mounted on the inner face of frame 68. Both coins 34 and 62 therefore, will be carried outwardly by frame 68 when operating plunger 50 is pulled to the dotted position shown in Fig. 8 and by way of elements 84, 86, 88, 96 and 100, frame 68 will swing outwardly to release both coins 34 and 62 and cause them to drop directly through return passage 82 formed between wall 74 and plate 110 and out through return conduit 82, forming a part of the return passage.

Figure 4:
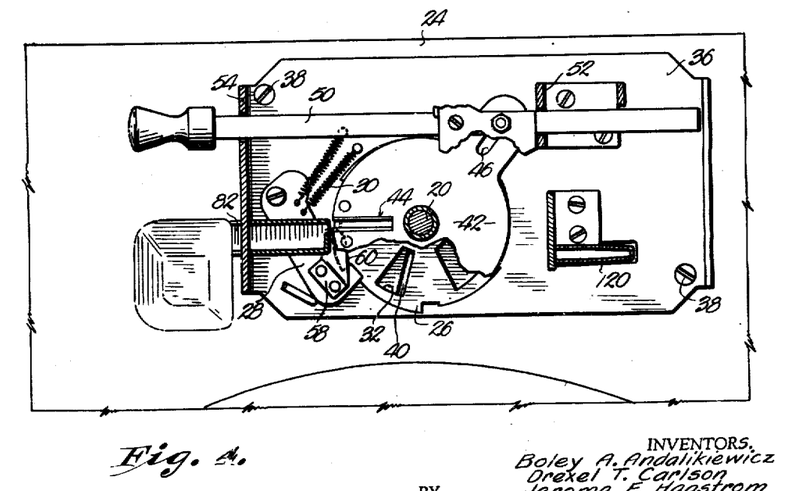
Fig. 4 is a horizontal sectional view taken on line IV—IV of Fig. 3.
Figure 5:
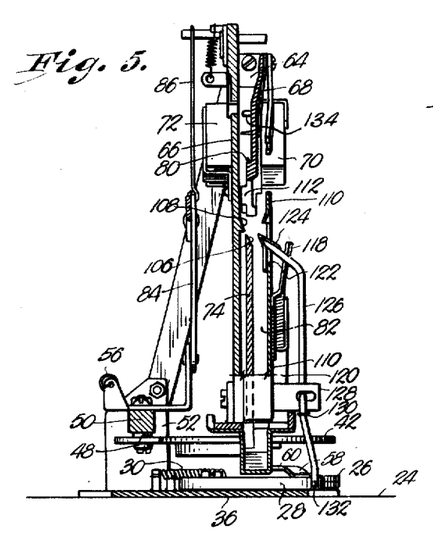
Fig. 5 is a vertical sectional view taken on line V—V of Fig. 3, looking in the direction of the arrows.

If upon introduction of a one cent piece, two or more five cent pieces were successively inserted in the machine in an attempt to operate the device several times without paying the necessary tax at each operation, the first nickel coming to rest in aperture 32 of ratchet 26 and slot 44 of plate 42, will serve as a bridge to direct each succeeding nickel into return conduit 82, which is in direct alignment with slot 44, as will be clear from Fig. 4.

Figure 1:
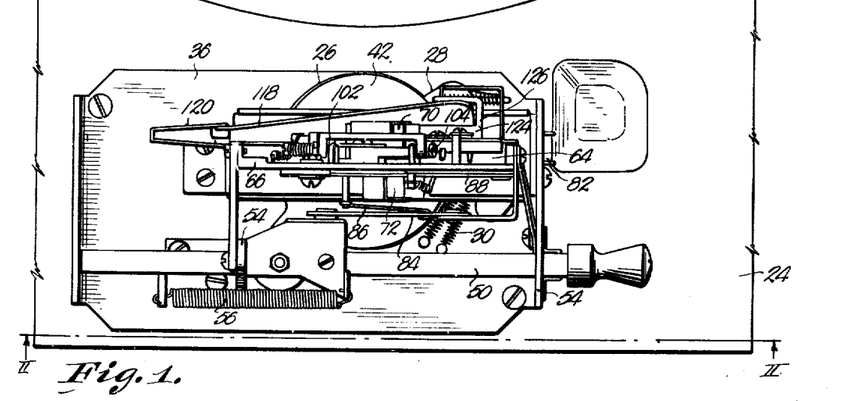
Fig. 1 is a top plan view of multiple coin controlled mechanism and vending machines made in accordance with the present invention.
Figure 2:
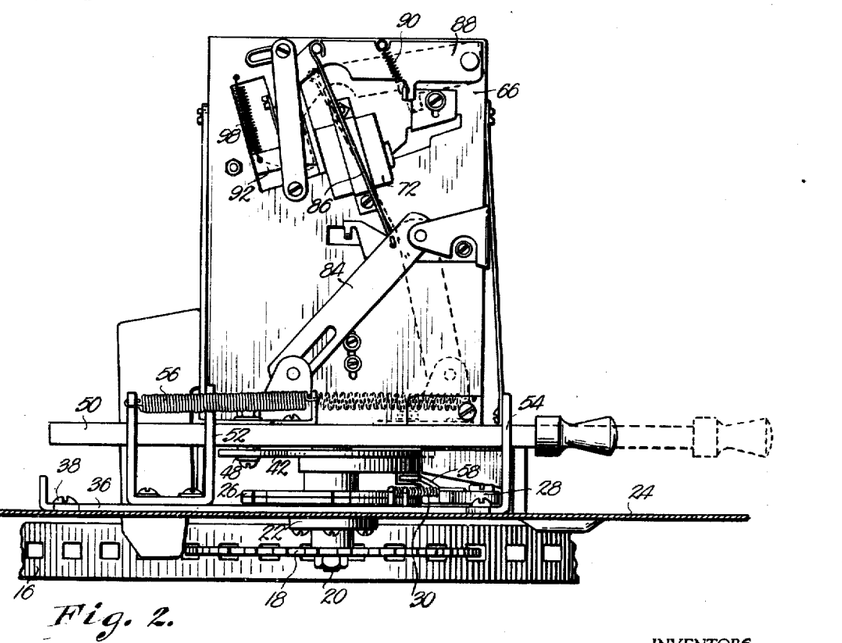
Fig. 2 is a vertical sectional view thereof, illustrating in a fragmentary manner, a portion of the vending machine controlling the availability of articles being sold, taken on line II—II of Fig. 1.
Figure 3:
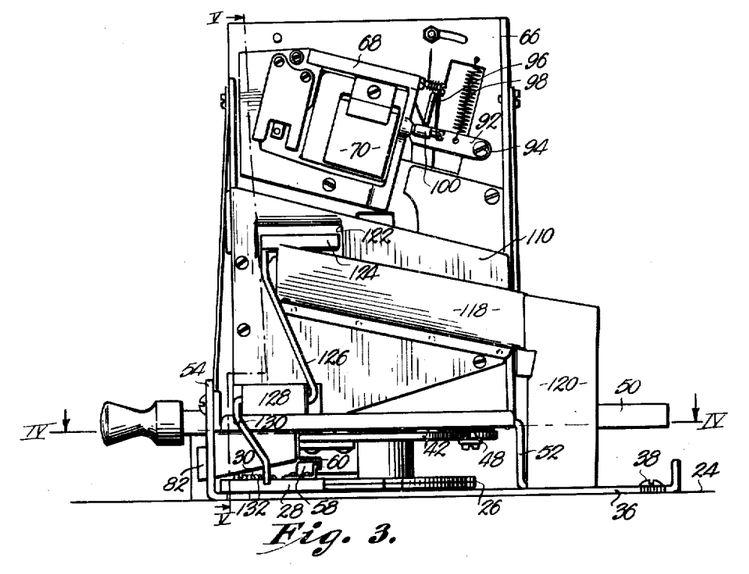
Fig. 3 is a side elevational view of the mechanism illustrating the means for directing one of the coins from the detent into the delivery chute.

In the form of the invention illustrated in Figs. 11 to 17 inclusive, the parts produce the same result but are formed somewhat differently. These parts are mounted upon a base plate 200 which in turn is carried by the cover of the vending machine in precisely the same manner as illustrated in Fig. 2.

Plate 200 carries a ratchet 202, a dog 204 therefor, and a plate 206 that is secured as at 208 to operating plunger 210. Spring 212 maintains plunger 210 at one end of its path of travel and when 202 and 206 are interconnected by coin 214, outward movement of plunger 210 will condition the vending machine where an article may be taken therefrom. An ear 216 on dog 204 is engaged by coin 214 as ratchet and plate 202 and 206 respectively, are moved about their axis of rotation by plunger 210.

The coin receiving mechanism comprises wall 218 through which opening 220 is formed and adjacent which the free end of spring 222 is disposed to permit the passage of coin 224, which in the instance shown, is a penny.

An auxiliary coin chute 226 leads from opening 220 to the coin box of the vending machine, not here shown. A frame 228 pivotally mounted by pins 230 and 232 and having a spring 234 to maintain said frame in normal position, is carried by wall 218 beside the portion thereof having an opening 220 therein.

A portion of frame 228 has a pocket or detent 236 provided therein to receive coin 224. The distance across the mouth of this detent 236 is less than the diameter of coin 214. This coin being a 5¢ piece, will therefore, not enter detent 236. Coin 224 will enter detent 236 and when the same is in position, coin 214 will strike the upper portion of the annular edge thereof and roll along shoulder 238 of frame 228 and through the path of travel indicated in dotted lines of Fig. 14.

A pin 240 on dog 204 is positioned to strike the lower end of rocker arm 242 journalled in bearings 244 on plate 246. A spring 248 maintains the inturned finger 250 of rocker arm 242, in the position illustrated in Fig. 15, and a guide slot 252 formed between fingers 254 serves to maintain rocker arm 242 in place.

An aperture 256 in communication with detent 236 in frame 228 receives finger 250 when the latter is reciprocated by the operation of the machine to force coin 224 from detent 236 and into chute 226.

When the mechanism just described and shown in Figs. 11 to 17 inclusive, is normally operated by the introduction of first a penny 224 and then a nickel 214, the penny moves into detent 236 and rests in that place until coin 214 drops thereon and passes to a position between ratchet 202 and plate 206 where it will interlock the same. Two coins having been dropped into the mechanism, it is now only necessary to pull rod 210 whereupon the coin will wipe against the cam face of ear 216 to move dog 204 from place in one of the notches of ratchet 202. When this is done, ratchet and plate may move about their axis of rotation and the vending machine parts are actuated to a point where an article may be obtained.

As said rotation occurs, pin 240 strikes the lower end of rocker arm 242 to move finger 250 on the upper end thereof, inwardly through aperture 256 and against coin 224. Such movement forces the coin from detent 236 and into auxiliary chute 226. This chute leads to the coin box, not here shown, and the 5¢ piece 214 drops into the same coin box, after the aperture 256 having the coin therein, is in register with slot 260 formed through base plate 200.

Figure 15:
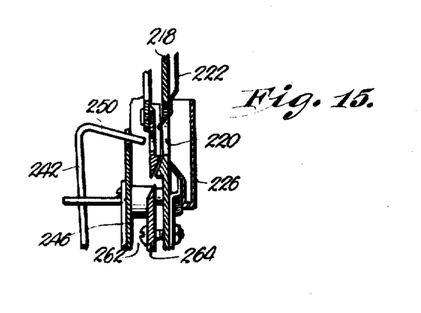
Fig. 15 is a fragmentary detailed sectional view taken on line XV—XV of Fig. 14.
Figure 16:
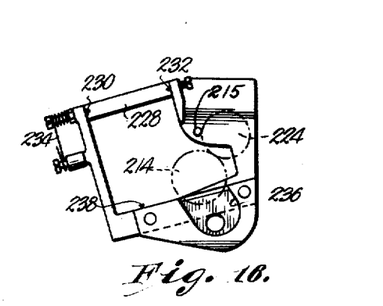
Fig. 16 is a side elevational view of the part wherein the detent for one coin is formed, entirely removed from its operative position.
Figure 17:
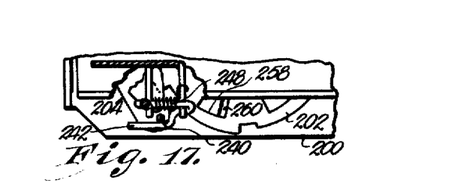
Fig. 17 is a fragmentary sectional view taken on line XVII—XVII of Fig. 13.

If the 5¢ piece 214 is dropped into the machine before penny 224, a condition such as illustrated in Fig. 16 will be established. Coin 238 will rest upon the portions of frame 228 at the mouth of detent 236 and there remain until plunger 210 is actuated to cause the coin to return to the operator through return conduit 262, a part of which is between plate 246 and wall 264 (Fig. 15). If a 5¢ piece 214 and a penny 224 are dropped into the mechanism, the penny will assume a position above the 5¢ piece 214 and against pin 215 on swingable frame 228. From this position the penny will drop with 5¢ piece 214 through return passage 262. When plunger 210 is actuated, the outward movement of plunger 210 will swing frame 228 about the axis of pins 230 and 232 through the medium of link 266, wire 268, rocker arm 270 and roller 272, against which the laterally extending portion 274 of rocker arm 270 engages.

From the foregoing, it will be clear that either embodiment of the invention is capable of insuring the proper operation of the vending machine with which the multiple coin controlled mechanism is associated. Not only will the two forms of the invention illustrated and described require that the coins be introduced in the proper sequence, but they will fulfill the desirable feature of insuring the user against the loss of any coins, if the same are not placed in the machine in a proper fashion. It is further apparent to one skilled in the art that the mechanism may be a part of slug or spurious coin rejecting apparatus.

Having thus described the invention, what is claimed as new and desired to be secured by Letters Patent is:

1. In a vending machine having a coin passage, a movable part for rendering available an article in the machine, and an operating plunger shiftable to and from a normal position, multiple coin controlled mechanism for interlocking the movable part and said plunger, when two coins of predetermined different diameters are introduced into the machine, said mechanism comprising a detent in said passage proportioned to arrest the passage of the smaller diametered coin; members secured to the said movable part and the said plunger respectively and provided with means for receiving the larger diameter coin from the coin passage to couple together the members; means for preventing the smaller, diametered coin from coupling together the movable part and the plunger and mechanism operable to dislodge the first mentioned coin from the detent upon manipulation of the plunger from the normal position to actuate the coupled members for rendering available an article in the vending machine.

2. In a vending machine having a coin passage, a movable part for rendering available an article in the machine, and an operating plunger shiftable to and from a normal position, multiple coin controlled mechanism for interlocking the movable part and said plunger when two coins of predetermined diameters are introduced into the machine, said mechanism comprising a detent in said passage proportioned to arrest the passage of a coin; members secured to the said movable part and the said plunger respectively and provided with means for receiving a second coin from the coin passage to couple together the members; and mechanism operable to dislodge the first mentioned coin from the detent upon manipulation of the plunger from the normal position to actuate the coupled members for rendering available an article in the vending machine, said first mentioned and the second coins being of different diameters, the detent being of a size to receive the smaller of said coins, the detent being formed to arrest the passage of both the first and second coins introduced when the first coin introduced into the coin controlled mechanism is the largest in diameter of the two coins capable of operating the machine.

3. In a vending machine having a coin passage, a movable part for rendering available an article in the machine, and an operating plunger shiftable to and from a normal position, multiple coin controlled mechanism for interlocking the movable part and said plunger comprising a detent in said passage proportioned to arrest the passage of a coin; members secured to the said movable part and the said plunger respectively and provided with means for receiving a second coin from the coin passage to couple together the members; an auxiliary coin chute; and mechanism operable to dislodge the first mentioned coin from the detent and direct the same into the auxiliary chute upon manipulation of the plunger from normal position to actuate the coupled members for rendering available an article in the vending machine, said detent being of a predetermined size to receive a coin of a given diameter, said detent having a stop adjacent thereto for arresting the movement of coins of diameters greater than the coins of a given diameter when coins of greater diameter than those of the given diameter are lodged in the detent, the stop being shiftable by movement of the operating plunger from its normal position to dislodge a coin arrested thereby, said detent comprising a pocket disposed beneath the path of travel of all coins passing along the said coin passage and intermediate the ends of the passage, whereby to cause the arrested coin to serve as a portion of the passage floor.

4. In a vending machine of the character described, multiple coin controlled mechanism comprising a coin passage; a swingable frame forming a part of the coin passage; and a detent in the passage proportioned to arrest the passage of coins of predetermined size, said detent comprising spaced apart stops on the frame and a stop on a stationary portion of the mechanism, said stops on the frame being positioned to arrest movement of coins of larger diameters than the coin of predetermined size independently of the stop on the stationary portion of the mechanism and to drop the so arrested coins of larger diameters when the frame is swung from a normal position.

5. In a vending machine of the character described, multiple coin controlled mechanism comprising a coin passage; a swingable frame forming a part of the coin passage; and a detent in the passage proportioned to arrest the passage of coins of predetermined size, said detent comprising spaced apart stops on the frame and a stop on a stationary portion of the mechanism, said stops on the frame being positioned to arrest movement of coins of larger diameters than the coin of predetermined size independently of the stop on the stationary portion of the mechanism and to drop the so arrested coins of larger diameters when the frame is swung from a normal position, said coin controlled mechanism having a trough for delivering a coin to a point of collection, and a deflector movable upon manipulation of the vending machine to direct coins from the detent into the delivery trough when a coin of predetermined size has been detained.

6. In a vending machine of the character described, multiple coin controlled mechanism comprising a coin passage; a swingable frame forming a part of the coin passage; and a detent in the passage proportioned to arrest the passage of coins of predetermined size, said detent comprising spaced apart stops on the frame and a stop on a stationary portion of the mechanism, said stops on the frame being positioned to arrest movement of coins of larger diameters than the coin of predetermined size independently of the stop on the stationary portion of the mechanism and to drop the so arrested coins of larger diameters when the frame is swung from a normal position, said coin controlled mechanism having a coin return conduit, a coin delivery trough for directing a coin to a point of collection, and a deflector movable upon manipulation of the vending machine to direct coins from the detent into the delivery trough when a coin of predetermined size has been detained, said frame being above the coin return conduit whereby to drop coins of diameters greater than the predetermined size thereinto when the frame is swung about its pivotal connection by manipulation of the vending machine after only a coin of larger than predetermined size has been introduced into the coin controlled mechanism.

7. In a vending machine of the character described, multiple coin controlled mechanism comprising a coin passage; a swingable frame forming a part of the coin passage; and a detent in the passage proportioned to arrest the passage of coins of predetermined size, said detent comprising spaced apart stops on the frame and a stop on a stationary portion of the mechanism, said stops on the frame being positioned to arrest movement of coins of larger diameters than the coin of predetermined size independently of the stop on the stationary portion of the mechanism and to drop the so arrested coins of larger diameters when the frame is swung from a normal position, said coins of larger diameters being supported by the stops on the frame with a portion thereof extending into the coin passage, said coin passage having a stop therein above the said stops to arrest the detained coins in precluding passage of any coins through the coin passage when a coin of larger than predetermined dameter is detained by the detents on the frame.

8. In a vending machine having a coin passage, a movable part for rendering available an article in the machine, and an operating plunger shiftable to and from a normal position, multiple coin controlled mechanism for interlocking the movable part and said plunger comprising a detent in said passage proportioned to arrest the passage of a coin; members secured to the said movable part and the said plunger respectively and provided with means for receiving a second coin from the coin passage to couple together the members; an auxiliary coin chute; mechanism operable to dislodge the first mentioned coin from the detent and direct the same into the auxiliary chute upon manipulation of the plunger from normal position to actuate the coupled members for rendering available an article in the vending machine, said detent being of a predetermined size to receive a coin of a given diameter, said detent having stops adjacent thereto for arresting the movement of coins of diameters greater than the coins of a given diameter, at least one of said stops being shiftable by movement of the operating plunger from its normal position to dislodge a coin arrested thereby; and a return coin chute, said mechanism for directing the first mentioned coin into the auxiliary coin chute being inoperative when the members on the movable part and the plunger are not coupled by a coin, whereby coins of other than predetermined diameters are returned when the detent stops are shifted.

9. In a multiple coin controlled mechanism for vending machines, a coin passage; a swingable frame forming a part of the passage; a detent on the frame proportioned to arrest the passage of a coin of predetermined size to produce a bridge for coins of different size subsequently inserted in the machine to allow movement of said last named coins through the passage for operable engagement with said mechanism; a coin box; a coin delivery trough disposed to convey said first named coin to the coin box after being detained by said detent; and a deflector for directing the detained coin into the delivery trough upon manipulation of the mechanism to operate the vending machine.

BOLEY A. ANDALIKIEWICZ.
DREXEL T. CARLSON.
JEROME E. HAGSTROM.